(12) United States Patent
Menzl et al.

(10) Patent No.: US 11,411,267 B2
(45) Date of Patent: Aug. 9, 2022

(54) COOLING DEVICE FOR BATTERY CELLS ASSEMBLED INTO A MODULE

(71) Applicant: Raiffeisenlandesbank Oberösterreich Aktiengesellschaft, Linz (AT)

(72) Inventors: Kilian Menzl, Linz (AT); Bernhard Maximilian Berger, Freistadt (AT); Johannes Pumsleitner, St. Peter/Au (AT); Philipp Kregl, Kefermarkt (AT); Peter Dobusch, Grünbach (AT)

(73) Assignee: Kreisel Electric GmbH & Co. KG, Rainbach im Mühlkreis (AT)

( * ) Notice: Subject to any disclaimer, the term of this patent is extended or adjusted under 35 U.S.C. 154(b) by 0 days.

(21) Appl. No.: 17/294,484

(22) PCT Filed: Oct. 3, 2019

(86) PCT No.: PCT/AT2019/060325
§ 371 (c)(1),
(2) Date: May 17, 2021

(87) PCT Pub. No.: WO2020/097638
PCT Pub. Date: May 22, 2020

(65) Prior Publication Data
US 2021/0408623 A1 Dec. 30, 2021

(30) Foreign Application Priority Data
Nov. 15, 2018 (AT) .............................. A 51006/2018

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/6567* (2015.04);
(Continued)

(58) Field of Classification Search
CPC .......... H01M 10/6556; H01M 10/613; H01M 10/6567; H01M 50/183; H01M 50/204;
(Continued)

(56) References Cited

U.S. PATENT DOCUMENTS

| 4,913,985 A | 4/1990 | Baer |
|---|---|---|
| 7,531,269 B2 | 5/2009 | Wegner |

(Continued)

FOREIGN PATENT DOCUMENTS

| DE | 102006010063 A1 | 9/2007 |
|---|---|---|
| DE | 102015219280 A1 | 4/2017 |

(Continued)

OTHER PUBLICATIONS

English language espacenet Abstract for DE 102006010063 A1, Sep. 6, 2007.

*Primary Examiner* — Lingwen R Zeng
(74) *Attorney, Agent, or Firm* — Tiajoloff & Kelly LLP

(57) ABSTRACT

A cooling device for battery cells assembled to form a module, having a base body and an insert which has receptacles for an end portion of the battery cells with recesses in the cell head. The insert together with the base body delimits a flow channel for a temperature control fluid A cooling device of this type permits operationally reliable accommodation of the battery cells with low manufacturing costs and high temperature control performance, without having to take manufacturing tolerances into account in advance. The receptacles form a fluid-tight membrane which encloses the end portion of the battery cells, which membrane is deformable for tolerance compensation of the individual battery cells and rests against the cell bottom when the flow channel is filled.

17 Claims, 2 Drawing Sheets

Figure 1:
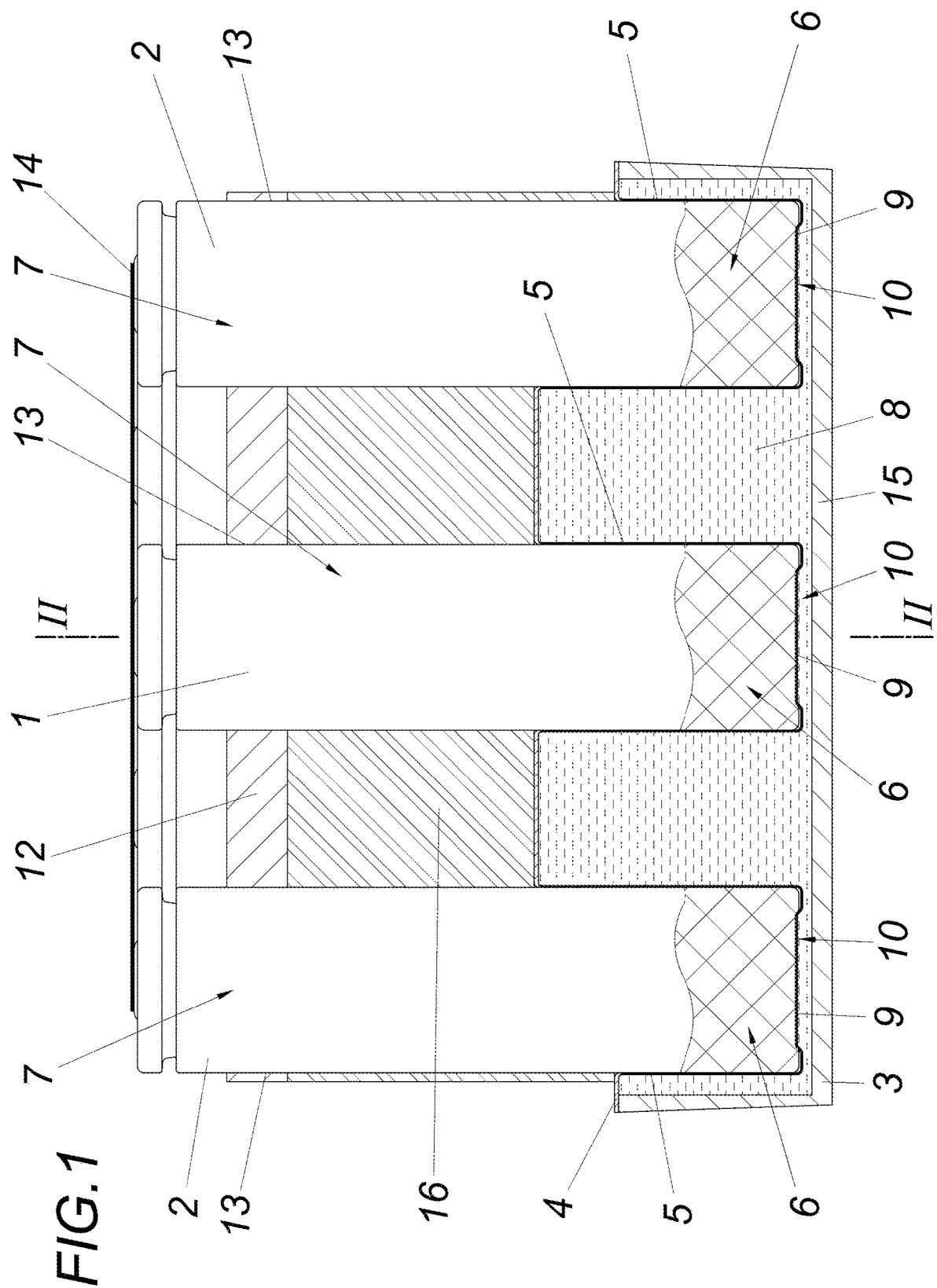

(51) Int. Cl.
| | |
|---|---|
| *H01M 10/6567* | (2014.01) |
| *H01M 50/204* | (2021.01) |
| *H01M 50/183* | (2021.01) |
| *H01M 10/643* | (2014.01) |
| *H01M 10/6557* | (2014.01) |

(52) U.S. Cl.
CPC ....... *H01M 50/183* (2021.01); *H01M 50/204* (2021.01); *H01M 10/643* (2015.04); *H01M 10/6557* (2015.04); *Y02E 60/10* (2013.01)

(58) Field of Classification Search
CPC .. H01M 10/643; H01M 10/6557; Y02E 60/10
See application file for complete search history.

(56) References Cited

U.S. PATENT DOCUMENTS

| | | |
|---|---|---|
| 8,021,595 B2 | 9/2011 | Birrell |
| 9,620,830 B2 | 4/2017 | Chan et al. |
| 10,665,912 B2 | 5/2020 | Jennrich et al. |
| 2006/0787789 | 4/2006 | Wegner |
| 2008/0233342 A1 | 9/2008 | Birrell |
| 2011/0097617 A1* | 4/2011 | Gu ..................... H01M 10/653 |
| | | 429/120 |
| 2012/0021166 A1 | 1/2012 | Birrell |
| 2016/0172727 A1 | 6/2016 | Chan et al. |
| 2018/0301771 A1 | 10/2018 | Jennrich et al. |

FOREIGN PATENT DOCUMENTS

| | | |
|---|---|---|
| WO | 03/103083 A1 | 12/2003 |
| WO | 2006/108529 A1 | 10/2006 |

* cited by examiner

COOLING DEVICE FOR BATTERY CELLS ASSEMBLED INTO A MODULE

TECHNICAL AREA

The invention relates to a cooling device for battery cells assembled to form a module, comprising a base body and an insert, which insert is having receptacles for an end portion of the battery cells excepting the cell head, whereby the insert together with the base body is delimiting a flow channel for a temperature control fluid.

STATE OF THE ART

In particular in connection with battery modules comprising cylindrical battery cells, cooling devices are known from the prior art (DE 102006010063 A1), which have a base body and an insert with receptacles for the individual battery cells, whereby the base body together with the insert is defining a flow channel for a temperature control fluid. The receptacles are such that they surround an end portion of the battery cells on the circumferential side, excepting the cell head in each case. To enable dissipation of the heat generated by the battery cells during operation, DE 102006010063 A1 states that only the cell bottom is in direct thermal contact with the temperature control fluid. For this purpose, the receptacles have a passage opening in the direction of the flow channel on the cell bottom side for the battery cells inserted therein, so that the cell bottom can be kept at least partially in contact with the temperature control fluid, for example by means of support ribs for the battery cells provided at the bottom of the flow channel. A disadvantage of this, however, is that due to the insert, which is preferably made of high-strength and dimensionally stable plastics, and the support ribs, the battery cells are fixed in the receptacles, so that the fluctuations in the cell geometry or the deformations of the cell contour, which occur due to the electrical and thermal operating state, are not compensated for and as a result both the battery cells and the cooling device insert can be mechanically damaged. A further disadvantage is that in this type of cooling device, the cylindrical battery cells, which are in direct contact with the temperature control fluid in the area of the negative cell pole, must be contacted either via a conductive temperature control fluid or via an electrical conductor which protrudes through the opening in the holder and makes contact with the negative cell pole.

In addition, there is an increased risk of temperature control fluid escaping from the flow channel due to changing cell contours, because the fit and thus the gap between the holder and the battery cell used in it can change as a result of the geometric changes occurring during operation in such a way that the temperature control fluid under pressure escapes from the flow channel through the openings. In general, manufacturing tolerances of the battery cells must be taken into account in advance for such cooling devices in order to avoid temperature control fluid escaping from the flow channel and to keep the gap between the receptacles and the battery cells inserted therein as small as possible.

REPRESENTATION OF THE INVENTION

The invention is therefore based on the task of designing a cooling device of the type described above in such a way that the battery cells can be reliably accommodated with low manufacturing costs and high performance with respect to temperature control, without having to take into account the manufacturing tolerances of the battery cells in advance.

The invention solves this problem in that the receptacles form a fluid-tight membrane enclosing the end portion of the battery cells, which membrane is designed to be deformable to compensate for the tolerances of the individual battery cells and rests against the bottom of the cells when the flow channel is filled.

As a result of these features, reliable tolerance compensation can be provided in the event of operationally induced changes in geometry, both with regard to cell contour variations and with regard to the relative position of the cells held in the receptacles with respect to one another, while the membrane bears against the cell bottom via the receptacle portion opposite the cell bottom and constituting a stop limit for the battery cells in the insertion direction as a result of the set system pressure and the force applied to the membrane by the temperature control fluid. The deformable membrane enclosing the end portion of the battery cells can be compressed or stretched in accordance with the changes in shape occurring in the cell contour and thus adapt to the cell contour, ensuring that the end portions of the battery cells are held securely in the respective receptacles both circumferentially and via the receptacle portion opposite the cell bottom. In order to allow simple design conditions and, at the same time, additional tolerance-compensating displacement of the battery cells relative to one another, the insert according to the invention can be formed in one piece as a membrane and designed in the sense of a mold carrier having a plurality of receptacles. With regard to the temperature control of cylindrical battery cells, it has also been shown that at least as efficient temperature control can be achieved by an exclusive heat exchange via the cell bottom or via the cell end portion compared to sufficiently known temperature control concepts regarding the cell sheaths. To enable the best possible heat transfer between the temperature control fluid and the cell bottom enclosed by the fluid-tight membrane, the membrane is designed to be flexible at least in the area of the cell bottom, so that when the flow channel is filled, it contacts the cell bottom due to the prevailing system pressure. In particular, the membrane is applied to the cell bottom in such a way that any air mass lying between the membrane and the cell bottom, which air mass might act as an additional insulator and impairing the efficiency of the cooling device, is largely displaced by the membrane. Although the choice of material for the membrane according to the invention can in principle be made in such a way that it exhibits plastic-elastic deformation behavior, particularly favorable conditions result if the membrane is made of elastic materials that can be deformed reversibly and almost without hysteresis, so that the battery cells can be kept under preload in them if the receptacles are appropriately dimensioned. According to some embodiments, the membrane may be based, for example, on silicone polymers or thermoplastic elastomers, with the material thickness selected to minimize thermal resistance while providing adequate mechanical stability. Accordingly, membranes based on such plastics can be additionally additivated to improve the heat transfer properties. Due to the measures according to the invention, it is also possible, on the one hand, to use different temperature control fluids irrespective of their electrical conductivity and, on the other hand, to insert the battery cells into the receptacles with the cell sheaths stripped, so that negative contacting can take place via the exposed cell sheath portions adjoining the insert. To ensure that the reaction gas can be safely discharged in the event of a battery cell outgassing via the cell bottom, it is possible to design the membrane according to the invention in the region of the cell bottom in such a way that the reaction gas is directed into the temperature control fluid of the flow channel, for example by the membrane having a predetermined breaking point at this point. To further improve the temperature control performance, the cooling device according to the invention can comprise flow guide elements, for example guide ribs, arranged in the flow channel for turbulence amplification, according to further embodiments.

Due to different electrical operating conditions as well as due to different constructive designs of the module, module areas can form which are subject to different thermal loads, which can subsequently promote the formation of undesired heat accumulation zones and reduce the overall performance of such modules.

In order to promote the formation of a uniform temperature distribution in the module, it is proposed that the individual receptacles have different thermal resistances. This can be achieved, for example, by the receptacles having a thermal insulation layer in the area of the cell bottom or by the receptacles having different material thicknesses, in particular in the case of one-piece inserts. Accordingly, module areas with cells subject to greater thermal stress can have receptacles with a lower material thickness.

In order to achieve constant heat dissipation within the module, the receptacles can comprise different receptacle depths for cell bottoms aligned in the same plane. This means that the battery cells, which are usually aligned as a cell group with constant height and uniform with respect to their cell head-side contacting plane, are enclosed by the receptacles with their respective cell bottom-side end portions in such a way that the size of the heat transfer surface of the receptacles in contact with the respective cell end portions is different. For example, according to some embodiments, this can be achieved in a simple manner in that the insert forming the membrane is designed as a mold carrier that is essentially concavely or convexly curved or linearly rising or falling in portions relative to the cell head-side contacting plane, the respective curvature profile depending on where battery cells subject to greater or lesser thermal stress are located within the module or cell group. In the case of concave curvature, the battery cells arranged at the edges have a smaller heat transfer surface to their respective receptacles than those arranged centrally in the cell group, whereas this is exactly the opposite in the case of convex curvature.

To ensure secure positioning and retention of the battery cells in the receptacles, it is suggested that the battery cells are bonded into the receptacles. Particularly favorable conditions result, for example, if the bonding takes place via an adhesive heat-conducting paste introduced into the receptacles.

The invention also relates to a carrier for battery cells assembled into a module with a cooling device according to the invention, wherein the exposed cell portions adjoining the insert are at least partially embedded in a casting compound. As a result of these features, a secure fit and sufficient mechanical stability of the battery cells can be achieved at low manufacturing costs, irrespective of the prevailing system pressure, despite the yielding membrane of the cooling device. The exposed cell portions are thereby fixed in their position within the module at least in the radial direction of the inserted battery cells in such a way that these cannot pivot relative to one another in the assembled state. In order to nevertheless enable tolerance compensation of the embedded battery cells, the casting compound can advantageously be selected in such a way that in the cured state it exhibits sufficient yielding with respect to the fluctuating cell contours. Advantageously, these design measures also result in a more efficient assembly process, because the battery cells are inserted into the insert without having to be pre-sorted in terms of cell geometry beforehand, after which the flow channel is pressurized with system pressure and the carrier is then filled with casting compound, thus embedding the exposed cell portions therein and stabilizing the battery cells in their position.

BRIEF DESCRIPTION OF THE INVENTION

In the drawing, the object of the invention is shown, for example. It shows

Figure 2:
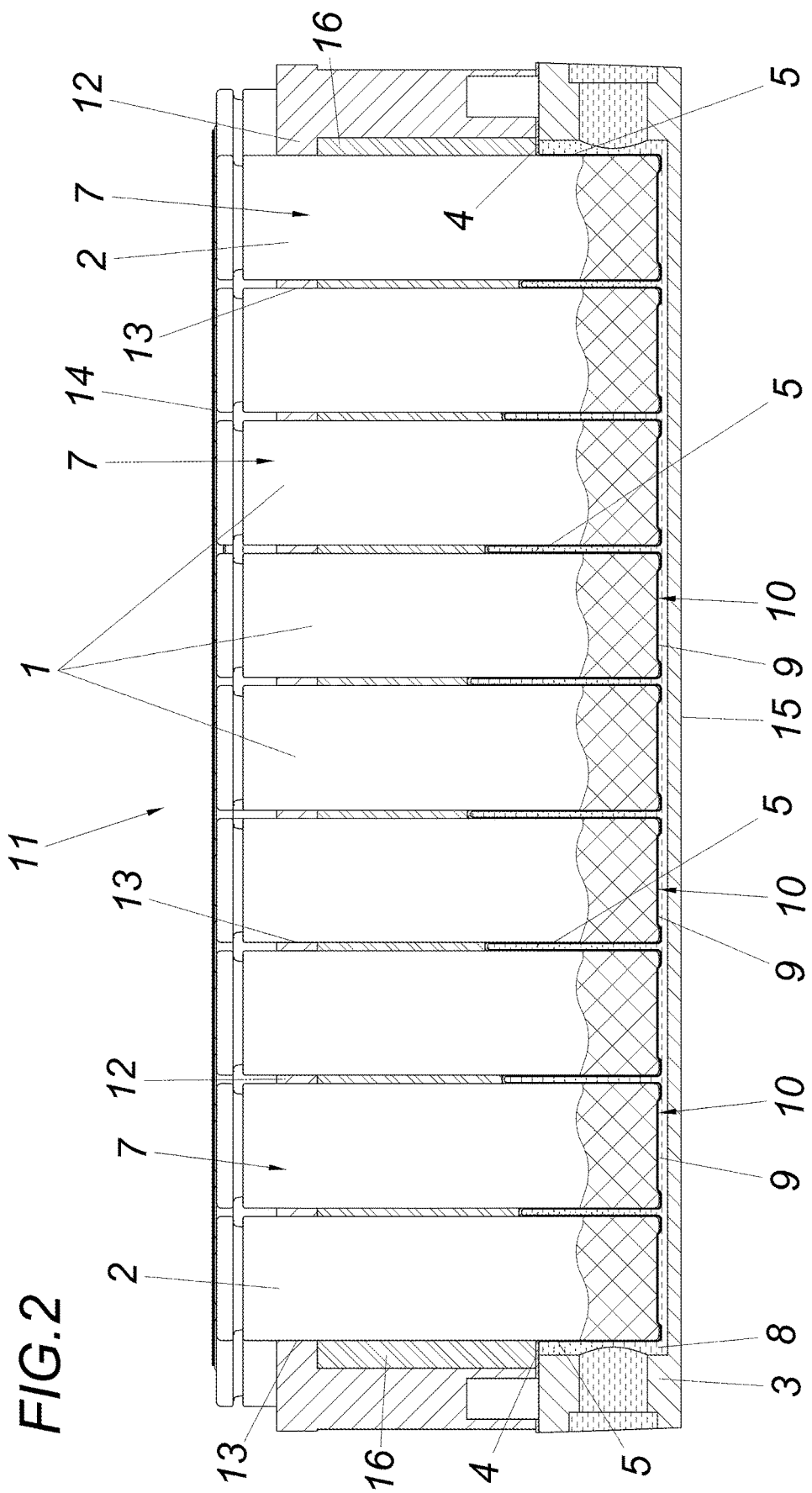

FIG. 1 A schematic sectional view of a carrier for battery cells assembled to form a module with a cooling device according to the invention, and FIG. 2 a section along line II-II of FIG. 1 on a smaller scale.

WAYS TO CARRY OUT THE INVENTION

A cooling device according to the invention for individual battery cells 1,2 assembled to form a module has a base body 3 and an insert 4. The insert 4 comprises receptacles 5 for an end portion 6 of the battery cells 1, 2, excepting the cell head 7. Together with the base body 3, the insert 4 forms a flow channel 8 for a temperature control fluid.

The receptacles 5 form a fluid-tight membrane 9 enclosing the end portion 6 of the battery cells 1,2, which is designed to be deformable for tolerance compensation of the individual battery cells 1,2. When the flow channel 8 is filled, the membrane 9 contacts the cell bottom 10 as a result of the prevailing system pressure.

According to particularly favorable embodiments, the insert 4 can be formed in one piece as a membrane 9 having several receptacles 5 in the sense of a mold carrier.

The cooling device according to the invention is arranged on a carrier 11 which has a carrier frame 12 through which the battery cells 1, 2 pass. The individual battery cells 1, 2 can be contacted, for example, via peeled cell sheath portions 13, i.e. cell sheath portions 13 with stripped cell sheath, and via a contacting plane 14 on the cell head side.

In one embodiment, the receptacles 5 have different receptacle depths when the cell bottoms 10 are aligned in the same plane, as can be seen in FIGS. 1 and 2. This can be achieved, for example, by the insert 4 forming the membrane 9 being concave with respect to the cell head-side contacting plane 14 or convex with respect to the bottom 15 of the base body 3. As a result of this design variant of the insert 4, a larger heat transfer surface of the membrane 4 is available to the battery cells 1 arranged in the center of the carrier 11 than to the battery cells 2 arranged in the edge regions of the carrier 11, as can be seen in FIG. 2.

In the embodiment shown in FIGS. 1 and 2, the exposed cell sheath portions 13 of the battery cells 1,2 adjacent to the insert 4 are embedded in a casting compound 16.

The invention claimed is:

1. A cooling device for battery cells assembled to form a module, said cooling device comprising:
   a base body and an insert that has receptacles receiving an end portion of each of the battery cells excluding a cell head thereof, wherein the insert together with the base body delimits a flow channel receiving therein a temperature-control fluid, wherein the receptacles form a fluid-tight membrane that encloses the end portions of the battery cells, said fluid-tight membrane deforming responsive to pressure of the fluid when the flow channel is filled such that the membrane rests against bottoms of the battery cells, and being deformable so as to provide individual tolerance compensation of the battery cells.

2. A cooling device according to claim 1, wherein the individual receptacles have differing thermal resistances forming a uniform temperature distribution in the module.

3. A cooling device according to claim 1, wherein the receptacles have different receptacle depths when the cell bottoms are aligned in the same plane.

4. A cooling device according to claim 1, wherein the battery cells are bonded into the receptacles.

5. A carrier for battery cells that are assembled to form a module, wherein the carrier has a cooling device according to claim 1 wherein portions of the battery cells adjoining the insert are at least partially embedded in a casting compound.

6. A cooling device according to claim 2, wherein the receptacles have different receptacle depths when the cell bottoms are aligned in the same plane.

7. A cooling device according to claim 2, wherein the battery cells are bonded into the receptacles.

8. A cooling device according to claim 3, wherein the battery cells are bonded into the receptacles.

9. A carrier for battery cells that are assembled to form a module, wherein the carrier has a cooling device according to claim 2, wherein portions of the battery cells adjoining the insert are at least partially embedded in a casting compound.

10. A carrier for battery cells that are assembled to form a module, wherein the carrier has a cooling device according to claim 3, wherein portions of the battery cells adjoining the insert are at least partially embedded in a casting compound.

11. A carrier for battery cells that are assembled to form a module, wherein the carrier has a cooling device according to claim 4, wherein portions of the battery cells adjoining the insert are at least partially embedded in a casting compound.

12. A carrier for battery cells that are assembled to form a module, wherein the carrier has a cooling device according to claim 6, wherein portions of the battery cells adjoining the insert are at least partially embedded in a casting compound.

13. A carrier for battery cells that are assembled to form a module, wherein the carrier has a cooling device according to claim 7, wherein portions of the battery cells adjoining the insert are at least partially embedded in a casting compound.

14. A carrier for battery cells that are assembled to form a module, wherein the carrier has a cooling device according to claim 8, wherein portions of the battery cells adjoining the insert are at least partially embedded in a casting compound.

15. A cooling device according to claim 1, wherein the membrane deforms so as to displace air adjacent the bottom of the battery cells.

16. A cooling device according to claim 1, wherein the membrane is formed of material that exhibits plastic-elastic deformation behavior and deforms reversibly.

17. A cooling device according to claim 1, wherein the membrane is formed of material that is selected from the group consisting of silicone polymers and thermoplastic polymers.

* * * * *